July 18, 1944.　　　F. T. FUGE　　　2,353,888
PICTURE PROJECTOR
Filed June 12, 1942　　　2 Sheets-Sheet 1
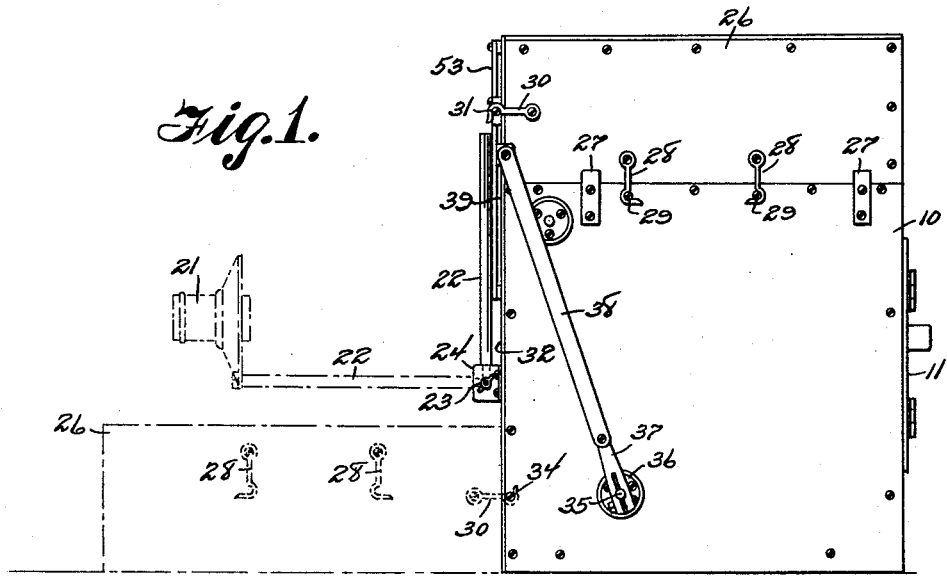
Fred T. Fuge INVENTOR.
BY
Victor J. Evans & Co.
ATTORNEYS July 18, 1944.    F. T. FUGE    2,353,888
PICTURE PROJECTOR
Filed June 12, 1942    2 Sheets-Sheet 2

Fred T. Fuge
INVENTOR.

BY
Victor J. Evans & Co.
ATTORNEYS

Patented July 18, 1944

2,353,888

UNITED STATES PATENT OFFICE 2,353,888

PICTURE PROJECTOR

Fred T. Fuge, Fostoria, Ohio

Application June 12, 1942, Serial No. 446,799

5 Claims. (Cl. 88—28)

This invention relates to a picture projector and more particularly to a projector for projecting glass slides on to a screen for lecture purposes and has for an object to provide a device of this character in which the device may be folded into the form of a carrying case.

A further object is to provide a device of this character having a magazine on the top for the storage of slides, the top of the device being adapted to be attached below the front of the device to receive the slides as they automatically pass down in front of the lens during the operation of the projector, so that the slides will always be arranged in proper sequence for the next lecture after completing a lecture.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 1 is a side elevation of a glass slide picture projector construed in accordance with the invention in folded position to form a carrying case.

Figure 2 is a vertical sectional view of the device taken on the line 2—2 of Figure 4.

Figure 5 is a detail vertical view of the device showing one of the springs for yieldably holding a slide in a proper position in the axis of light projection of the device.

Figure 3:
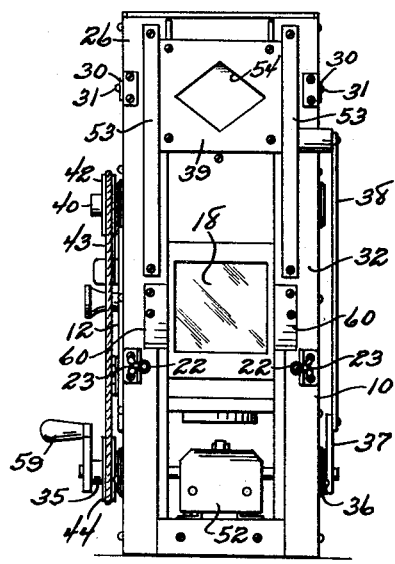
Figure 3 is a front elevation of the device.

Referring now to the drawings in which like characters of reference designate similar parts in the various views, the glass slide picture projector comprises a casing 10 preferably formed of sheet metal and having a door 11 at the back and a door 12 in one side wall to afford access to the interior of the casing. A light source, such as a lamp bulb 13, is mounted on a transverse partition 14 in the casing and a fan 15 is mounted on a transverse partition 17 in the casing in rear of the lamp bulb for cooling the interior of the casing. A pair of lenses 18 is mounted in the casing in a lens carrier 19 disposed on a transverse partition 20 in front of the lamp 13. A lens designated in general by the numeral 21 is mounted on a pair of bars 22, in the axis of light projection through the lenses 18. The bars are provided with laterally bent inner ends 23 which form pivots. The pivots are mounted in lugs 24 which project from the front wall of the casing so that the bars may be rocked upwardly to folded position against the front of the casing after the lens 21 has been removed by removing the securing screws 25 so that the casing may be used as a carrying case for transportation.

An opening bottom casing 26 is secured on top of the casing 10 by guide straps 27 which extend above the side walls of the casing 10 and by hooks 28 which are engageable with pins 29 projecting from the side walls of the casing. Also, hooks 30 carried by the casing 26 are hooked over pins 31 carried by a frame 32, see Figure 3, which extends vertically upon the front wall of the casing 10. The purpose of the casing 26 is to house glass picture slides 33 for transportation and storage when the device is not in use as a projector and when the device is to be used as a projector the casing 26 is removed from the casing 10 and inverted, and attached to the front of the casing 10 at the bottom thereof, by the aforesaid hooks 30 engaging pins 34 on the side walls of the casing 10, see Figure 1. In this position the casing 26 forms a container for receiving the glass slides after the same have been passed in front of the projecting lenses, in the same order the slides are fed from the slides on top of the casing 10 so that when an illustrated lecture, for example, has been completed, the used glass slides will be stacked, in proper sequence, for the next lecture.

Figure 7:
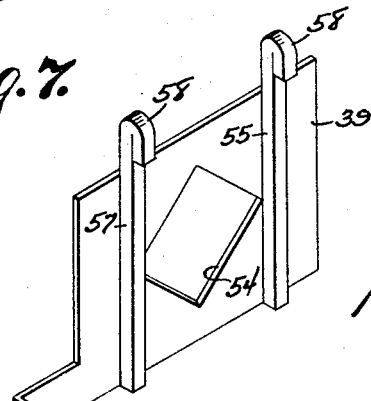
Figure 7 is a detail perspective view of the slide carrier.

A main drive shaft 35 is mounted in bearings 36 adjacent the bottom of the casing 10 and carries a crank arm 37, see Figure 1, which is connected by a pitman 38 to the slide carrier 39, see Figure 7.

Figure 4:
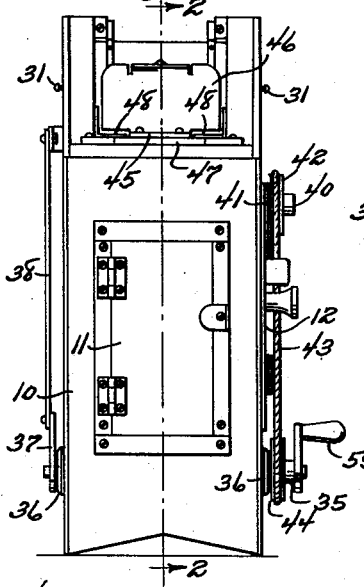
Figure 4 is a rear elevation of the device.

A second shaft 40 is mounted in bearings 41 adjacent the top of the casing 10 and carries a pulley 42 which is driven by a spring belt 43 which engages a pulley 44 carried by the main drive shaft 35, see Figure 4.

Secured to the upper shaft 40, and adapted to be wound thereon is a band 45 of heavy fabric, see Figure 2, or other suitable material. The outer end of the band is secured to an angular follower 46 having a bottom flange 47 disposed between guide flanges 48 and the top of the casing 10, see Figure 4. The follower feeds the slides 33 to the slide carrier 39.

Figure 6:
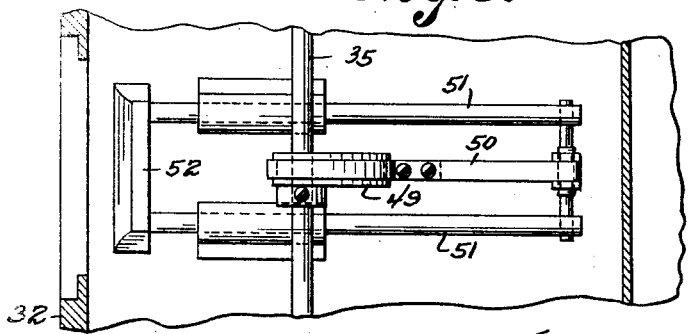
Figure 6 is a detail horizontal sectional view taken on the line 6—6 of Figure 2.

The main drive shaft 35, see Figure 6, carries an eccentric 49 on the strap 50 of which is mounted a yoke 51 which carries a pusher or slide ejector 52 disposed adjacent the bottom of the casing 10, see Figure 2.

The slide carrier 39 is mounted between vertically disposed guide flanges 53, see Figure 5, to move in a vertical path in front of the lenses 18 on the frame 32, see Figure 3. The slide carrier is provided centrally with a rectangular opening 54 which exposes the image on the glass slide, when the carrier moves the glass slide downwardly into the axis of light projection. The slide carrier is provided on the rear face with a pair of bars 55, see Figure 7, the upper ends of which project above the slide carrier and are reversely bent downwardly as shown at 58 to engage the top edge of the foremost glass slide in the supply on top of the casing 10 and move said slide downwardly first to the exis of light projection to be projected on to a suitable screen, and then to a position below the axis of light projection into the path of the pusher 52 to be applied to the rear of the stack of used slides, see Figure 2, during rotation of the main drive shaft 35 by means of its crank handle 59. After the used slide arrives in the path of the pusher 52 the pusher engages the slide and adds it to the supply of used slides during the continued rotation of the crank handle 59.

A pair of leaf springs 60 is secured to the frame 32, see Figures 2 and 3, and overlap the glass slide 33 when the slide arrives in the axis of light projection to hold the slide steady while the image is being reflected on to the screen.

Since the operation of the parts has been described as the description of the parts progressed, it is thought the invention will be fully understood without further explanation.

What is claimed is:

1. A projector for projecting glass slides comprising a casing, a magazine on the top of the casing having an open bottom, means removably securing the magazine to the casing, said magazine being adapted to contain glass slides and to be adapted to be removed from the top of the casing and secured in front of the casing at the bottom thereof for receiving the slides after use, guide flanges on top of said casing for holding the supply stack of slides to be projected, a follower on top of the casing adapted to be disposed in rear of the stack of slides for feeding the slides forwardly to be projected, means for feeding the follower forwardly, a slide carrier mounted for vertical movement on the front of the casing adapted to pick up a slide from the front of the stack on top of the casing and move it downwardly to the bottom of the casing past an axis of light projection, a means for moving the carrier vertically, a slide ejector mounted in the bottom of the casing adapted to be slid forwardly to engage a used slide at the bottom of the casing, and means for moving the slide ejector to eject a used slide into the magazine disposed at the bottom of the casing.

2. The structure as of claim 1 and in which means for actuating the slide carrier comprises a main drive shaft mounted in bearings adjacent the bottom of the casing, a crank arm connected to the shaft and a connecting rod connected to the slide carried and to the crank arm.

3. The structure as of claim 1 and in which the follower is actuated through the medium of a driven shaft disposed adjacent to the top of a housing, and a band of heavy fabric secured to the shaft and to the follower, said band being adapted to be wound upon the shaft during rotation of the shaft.

4. The structure as of claim 1 and in which the means for actuating the slide ejector comprises a driven main shaft, an eccentric on the shaft having a strap, and a yoke carried by the strap connected to the ejector.

5. The structure as of claim 1 and in which there is added thereto a light source in the casing lenses in the casing forming an axis of light projection for projecting the image on a slide on to a screen, and spring means on the casing laterally of the axis of light projection adapted to engage a slide and hold the slide steady during the projecting operation.

FRED T. FUGE.